Sept. 17, 1963 M. WIZELMAN 3,104,172
PACKAGED COMESTIBLE
Filed Oct. 6, 1961 2 Sheets-Sheet 1

INVENTOR.
MORRIS WIZELMAN
BY *Arthur H. Seidel*
ATTORNEY

Sept. 17, 1963  M. WIZELMAN  3,104,172
PACKAGED COMESTIBLE
Filed Oct. 6, 1961  2 Sheets-Sheet 2

*INVENTOR.*
MORRIS WIZELMAN
BY Arthur H. Seidel
ATTORNEY

United States Patent Office 3,104,172
Patented Sept. 17, 1963

3,104,172
PACKAGED COMESTIBLE
Morris Wizelman, Cheltenham, Pa., assignor to Globe Industries, Inc., Philadelphia, Pa., a corporation of Pennsylvania
Filed Oct. 6, 1961, Ser. No. 143,360
1 Claim. (Cl. 99—171)

This invention relates to a packaged comestible, and more particularly, to a packaged comestible product which is water and air tight so as to prevent contamination, prevent breakage, and yet provide an aesthetic display for the comestible product.

In my copending patent application Serial No. 144,222, filed on October 10, 1961, now Patent No. 3,092,945, and entitled Blister Packaging Machine, I disclose an apparatus wherein blister sheets made from a synthetic resin are capable of being heat sealed to a display card in a more efficient and automatic manner. The present invention is directed to the products capable of being made on the apparatus disclosed in said copending application.

In recent years, there has been a growing demand for packaged comestibles which are both attractive and practical. The packaged comestible of the present invention accomplishes these goals by utilizing a transparent sheet of plastic material heat-sealed to a display card. The sheet of plastic material is provided with integral blisters which may be separate from one another or interconnected with one another. The comestible is of substantially the same size and configuration of the blisters.

Accordingly, the comestible packaged in accordance with the present invention will be visible through the transparent sheet of plastic material and is less susceptible to breakage during handling and transportation thereof since the comestible is of substantially the same size as the blister. The sheet of plastic material is preferably heat sealed to the display card by the application of heat and pressure. The heat necessary to effect a seal is applied to the sheet of plastic material adjacent to but spaced from the various comestibles within the blisters thereby driving out moisture in the comestible. Thus, the packaged comestible of the present invention is rendered in a more preferred state for storage purposes while at the same time being enclosed within a blister of substantially the same size and shape and the sheet of plastic material cooperates with the display card so as to form a hermetic seal therebetween. Thus, the comestibles may be stored for long periods of time without damage thereto, may be attractively displayed, and are less susceptible to breakage than packaging methods proposed heretofore.

It is an object of the present invention to provide a novel packaged comestible.

It is another object of the present invention to provide a novel package wherein a comestible is disposed within a blister on a sheet of plastic heat-sealed to a display card.

It is another object of the present invention to provide a novel package wherein comestibles are disposed within blisters on a transparent sheet of synthetic resin, with said sheet being heat-sealed to a display card with a hermetic seal whereby the comestible is packaged in a water and air tight manner.

It is another object of the present invention to provide a novel package wherein a comestible is disposed within a blister of substantially the same size and shape whereby the comestible is less susceptible to damage due to handling and transportation.

It is still another object of the present invention to provide a novel package wherein a plurality of comestibles are disposed within a corresponding number of interconnected blisters in a transparent sheet of synthetic resin which is heat-sealed to a display card.

Other objects will appear hereinafter.

For the purpose of illustrating the invention there is shown in the drawings forms which are presently preferred; it being understood, however, that this invention is not limited to the precise arrangements and instrumentalities shown.

Referring to the drawing in detail, wherein like numerals indicate like elements, there is shown in FIGURE 1 a plan view of a packaged comestible designated generally as 10.

The packaged comestible 10 comprises a flat planar sheet of semi-stiff paper or cardboard 12. One of the major faces of the sheet 12 is provided with a portion which is coated with a nitrocellulose material such as pyroxylin.

Figure 1:
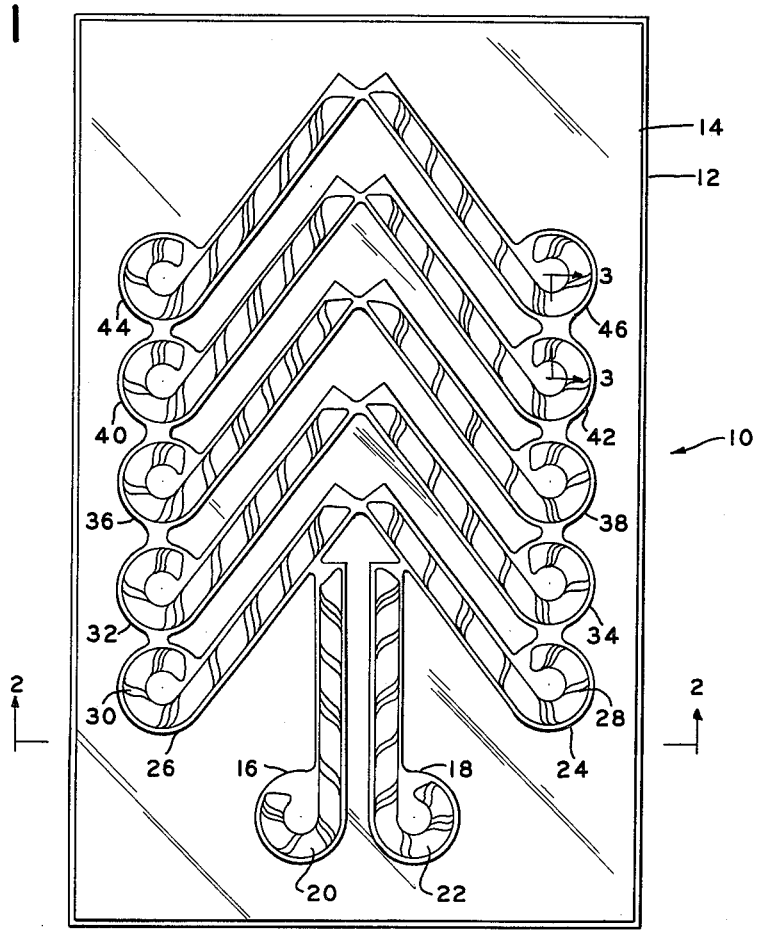
FIGURE 1 is a top plan view of a packaged comestible of the present invention.

A plastic sheet 14 is provided with a size corresponding to the coated portion of the sheet 12. The sheet 14 is preferably made from a synthetic resin such as transparent cellulose acetate, transparent polyvinyl chloride, etc. As illustrated in FIGURE 1, one entire side of the sheet 12 is coated with pyroxylin and the sheet 14 is slightly smaller than the sheet 12.

Figure 2:
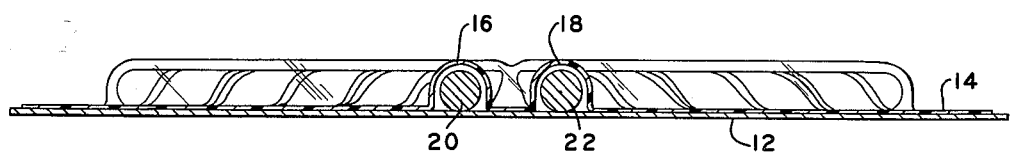
FIGURE 2 is a transverse sectional view taken along the lines 2—2 in FIGURE 1.
Figure 3:
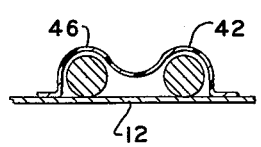
FIGURE 3 is a sectional view taken along the lines 3—3 in FIGURE 1.

The sheet 12 is preferably provided with advertising matter prior to being coated with pyroxylin. The plastic sheet 14 is capable of cooperating with the pyroxylin coating to effect a hermetic seal therebetween when subjected to pressure and heat for a predetermined period of time. For example, I have made a packaged comestible as illustrated in FIGURES 1–3 wherein the pressure was approximately 3,000 pounds, the temperature as 300° F. and the time period was 2½ seconds. These figures may be varied in accordance with the material utilized and the apparatus on which the packaging is being effected.

The sheet 14 is provided with a plurality of blisters which are integral therewith but disposed out of the plane of the sheet 14. Thus, the sheet 14 is provided with blisters 16 and 18. A comestible such as candy cane 20 is disposed within the blister 16 and a comestible such as candy cane 22 is disposed within the blister 18. It will be noted that the comestible is of substantially the same size and shape as the blister in which it will be disposed. Accordingly, the comestible is less susceptible to breakage during handling and transportation.

As illustrated in FIGURES 1–3, a plurality of blisters may be provided, with each blister being interconnected with another blister. Thus, blister 16 merges into blister 26 and blister 18 merges into blister 24 with one end of the blisters 24 and 26 being merged together. A comestible such as candy cane 30 may be disposed within blister 26 and a candy cane 28 may be disposed within blister 24. In like manner, interconnected blisters 32–46 are provided.

As shown more clearly in FIGURE 3, the interconnecting portion between adjacent blisters is depressed so as to be spaced from the sheet 12 by a distance less than the height or thickness of the comestible. This feature aids in preventing the comestibles from moving from one blister to another.

Figure 4:
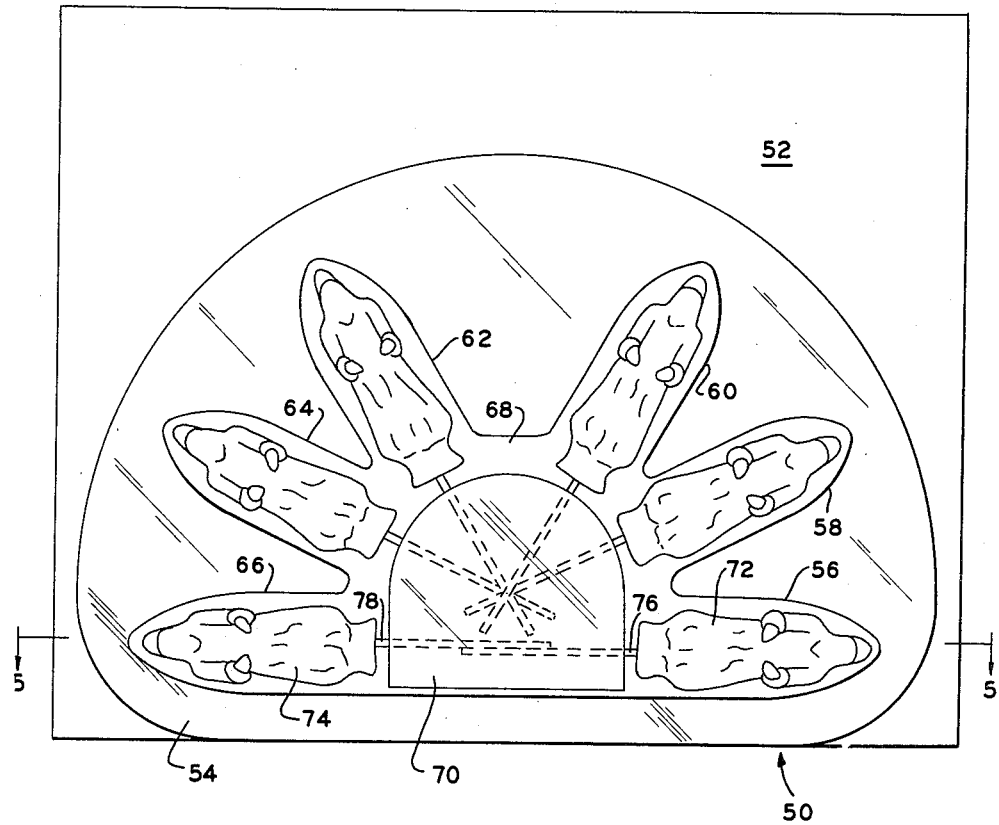
FIGURE 4 is a top plan view of another embodiment of the present invention.
Figure 5:
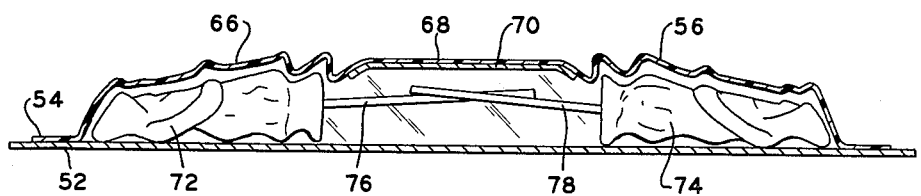
FIGURE 5 is a transverse sectional view taken along the lines 5—5 in FIGURE 4.

As shown more clearly in FIGURES 4 and 5, there is illustrated another embodiment of the present invention designated generally as 50. The packaged comestible 50 comprises a base sheet 52 which is identical with base sheet 12. A plastic sheet 54 made from the identical material as plastic sheet 14 is heat-sealed to one surface of the sheet 52 which has been coated with a layer of pyroxylin. The sheet 54 is provided with a plurality of radially directed blisters 56–66. Each of the blisters 56–66 merge into a central blister 68.

A cardboard insert 70 is disposed within the central blister 68 as shown more clearly in FIGURE 5. The cardboard insert 70 is opaque, is of the same general shape as the blister 68, but is smaller than said blister 68. The embodiment of the present invention illustrated in FIGURES 4 and 5 is particularly adapted for use with comestibles having stems. Thus, comestibles such as lollipops 72 and 74 may be disposed within blisters 56 and 66 respectively. Lollipop 72 is provided with a stem 76 which extends into the central blister 68. Lollipop 74 is provided with a stem 78 which extends into the central blister 68.

In like manner, each of the blisters on the sheet 54 are adapted to receive a comestible such as a lollipop with the stems of the lollipops extending into the central blister 68.

In each of the above embodiments, the comestibles have a shape which is substantially identical with the shape of the blister within which it is received. Also, in each of the above embodiments the comestibles are disposed within interconnecting blisters. It is within the scope of the present invention to dispose comestibles within separate discrete blisters which do not interconnect with an adjacent blister.

Thus, it will be seen that the packaged comestible of the present invention is attractive, prevents breakage during handling and transportation of the comestible, and hermetically seals the comestible while at the same time enables excess moisture in the comestible to be driven off by the heat associated with the provision of a hermetic seal between the display card and a sheet of transparent plastic material.

As used hereinafter, a major face of the base sheet 12 is to be interpreted as the surface juxtaposed to the sheet 14 as compared with the side edges of the sheet 12.

It will be understood that the blisters, such as blister 16, is in the nature of a bubble disposed out of the plane of the sheet 14.

The present invention may be embodied in other specific forms without departing from the spirit or essential attributes thereof and, accordingly, reference should be made to the appended claim, rather than to the foregoing specification as indicating the scope of the invention.

I claim:

A package comprising a flat substantially planar base sheet made from paper, a portion of a major surface of said sheet having a coating thereon, a sheet of transparent plastic material overlying and in abutting contact with said portion of said base sheet, said coating and said plastic material being compatible with each other, said coating and said plastic material being heat sealed together so as to form an hermetic seal therebetween, said sheet of plastic material having a plurality of blisters integral therewith and disposed out of the plane of said sheet of plastic material, each of said blisters communicating with an adjacent blister, comestibles disposed within each of said blisters, each of said blisters substantially conforming to the shape of said comestibles, a central blister provided in said sheet of plastic material, each of the remaining blisters in said sheet of plastic material being in communication with said central blister, each blister being in communication with an adjacent blister by way of said central blister.

References Cited in the file of this patent

UNITED STATES PATENTS

| | | |
|---|---|---|
| 2,621,129 | Ramsbottom et al. | Dec. 9, 1952 |
| 2,861,405 | Hanford | Nov. 25, 1958 |
| 2,874,836 | Wertepny | Feb. 24, 1959 |
| 2,884,127 | Neary | Apr. 28, 1959 |
| 2,892,538 | Middleton et al. | June 30, 1959 |

OTHER REFERENCES

"Modern Packaging," March 1960, pages 188, 189 and 302.